United States Patent
Collins

(10) Patent No.: US 7,095,855 B1
(45) Date of Patent: Aug. 22, 2006

(54) MESSAGE IDENTIFICATION WITH CONFIDENTIALITY, INTEGRITY, AND SOURCE AUTHENTICATION

(76) Inventor: Lyal Sidney Collins, 1/37 Walton Crescent, Abbotsford, New South Wales 2046 (AU)

( * ) Notice: Subject to any disclaimer, the term of this patent is extended or adjusted under 35 U.S.C. 154(b) by 0 days.

(21) Appl. No.: 09/856,283

(22) PCT Filed: Dec. 3, 1999

(86) PCT No.: PCT/AU99/01076

§ 371 (c)(1),
(2), (4) Date: Jul. 24, 2001

(87) PCT Pub. No.: WO00/35143

PCT Pub. Date: Jun. 15, 2000

(30) Foreign Application Priority Data

Dec. 4, 1998 (AU) .................................. PP7523

(51) Int. Cl.
*H04N 7/167* (2006.01)
(52) U.S. Cl. .................. 380/241; 713/170; 713/176; 726/26
(58) Field of Classification Search ................ 380/241; 713/200, 201, 170, 176; 726/26
See application file for complete search history.

(56) References Cited

U.S. PATENT DOCUMENTS

| | | | |
|---|---|---|---|
| 4,731,842 A | | 3/1988 | Smith |
| 4,896,319 A | | 1/1990 | Lidinsky et al. |
| 5,175,766 A | | 12/1992 | Hamilton |
| 5,483,658 A | * | 1/1996 | Grube et al. .................. 726/29 |
| 5,577,121 A | | 11/1996 | Davis et al. |
| 5,661,806 A | | 8/1997 | Nevoux et al. |
| 5,724,423 A | | 3/1998 | Khello |
| 5,828,851 A | * | 10/1998 | Nixon et al. ................. 710/105 |
| 5,838,812 A | | 11/1998 | Pare, Jr. et al. |
| 5,917,913 A | * | 6/1999 | Wang .......................... 705/67 |
| 5,956,404 A | * | 9/1999 | Schneier et al. ............ 713/180 |
| 6,745,936 B1 | * | 6/2004 | Movalli et al. ............. 235/379 |

FOREIGN PATENT DOCUMENTS

| WO | WO 98/32260 | * 12/1997 |
|---|---|---|
| WO | WO 9829983 | 7/1998 |
| WO | WO 9832260 | 7/1998 |

OTHER PUBLICATIONS

Eastlake, D. et al., *Randomness Recommendations for Security*, Dec. 1994.

* cited by examiner

*Primary Examiner*—Emmanuel L. Moise
*Assistant Examiner*—Shewaye Gelagay
(74) *Attorney, Agent, or Firm*—Ladas & Parry LLP

(57) ABSTRACT

A method for securely encoding and transmitting a message by an originating device to one of a plurality of recipient devices, said message being associated with a particular one of a plurality of application running on the originating device. Transmission is generated by using a device identifier, an application identifier and an application value, of a message value; combining the message value with one or more first secret values, said secret values being known substantially only to the originating device and one or more intended recipient device of the message, to establish a secret message value; applying the secret message value and the message to an encoding process to form a secure message block, and combining an address with a device identifier, the application identifier, the application value and the secure message block, to form a secure message for transmission which is decodable by the one or more of said intended recipient devices which thereby recover the message, the address, the device identifier, the application identifier and the application value.

14 Claims, 13 Drawing Sheets

Issuers                    Device-holders

MESSAGE IDENTIFICATION WITH CONFIDENTIALITY, INTEGRITY, AND SOURCE AUTHENTICATION

FIELD OF THE INVENTION

The present invention relates to the encoding and transmission of secure messages, in particular relating to aspects of confidentiality, integrity and auditability of messages in terms of authentication and integrity checking. In addition, the invention relates to reliable operation of such messaging functions in a network environment in which transmission delay and lost or duplication of messages can occur.

BACKGROUND OF THE INVENTION

The advent of secure storage and processing devices such as smart-cards, coupled with the increasing use of practicable electronic commerce technology, has highlighted shortcomings in secure message transfer technology. This relates in particular to the robustness and auditability of secure messages when transmitted over different types of "best effort" networks.

Fundamental requirements for electronic commerce include the ability to transmit and receive messages with an acceptable level of confidentiality and integrity, where this level depends on the particular commercial application. In addition, reliable authentication of these messages, namely identification and verification of the source of a received message is also needed to ensure that fraudulent transactions are not being initiated.

Emerging best effort networks such as wireless and the Internet, place additional demands on messaging technology, since message delay, loss and occasionally duplication does occur.

Proposed standards for cryptographic and authentication functions often exact a commercially prohibitive penalty on secure messaging, because of their requirement for significant overhead data and associated complex equipment to provide the cryptographic and/or authentication functions. Available techniques have also not been proven to be reliable or efficient in the context of the aforementioned best effort networks.

It is an object of the present invention to ameliorate one or more disadvantages of the prior art.

SUMMARY OF THE INVENTION

According to a first aspect of the invention, there is provided a method for encoding and transmitting by an originating device of a secure message the method comprising the steps of:

(a) generating by a first process using a device identifier, an application identifier and an application value a message value;

(b) combining the message value with one or more first secret values, said secret values being known substantially only to the originating device and one or more intended recipient devices of the message, to establish a secret message value;

(c) applying the secret message value and the message to an encoding process to form a secure message block; and (d) combining an address with the device identifier, the application identifier, the application value and the secure message block, to form a secure message for transmission, said secure message being decodable by the one or more of said intended recipient devices which thereby recover the message, the address, the device identifier, the application identifier and the application value.

According to another aspect of the invention, there is provided a method for reception of a securely transmitted message by a recipient device the method comprising the steps of:

(i) extracting one or more of a device identifier, an application identifier and an application value from a received secure message;

(j) generating by a first process using the device identifier, the application identifier and the application value a message value;

(k) generating, according to a second process using the device identifier and the application identifier one or more secret values known substantially only to an originating device and the one or more intended recipient devices of the message;

(l) combining the message value with the one or more secret values, to establish a secret message value;

(m) extracting a secure message block from the secure message; and (n) applying the secret message value and the secure message block to a decoding process to form the securely transmitted message, this message having been securely transmitted by the originating device.

According to another aspect of the invention, there is provided an apparatus for encoding and transmitting by an originating device of a secure message, the apparatus comprising:

(a) message generating means for generating, by a first process using a device identifier, an application identifier and an application value, a message value;

(b) first combining means for combining the message value with one or more first secret values, said secret values being known substantially only to the originating device and one or more intended recipient devices of the message, to establish a secret message value;

(c) application means for applying the secret message value and the message to an encoding means which performs an encoding process to form a secure message block; and (d) second combining means for combining an address with the device identifier, the application identifier, the application value and the secure message block, to form a secure message for transmission said secure message being decodable by the one or more of said intended recipient devices which thereby recover the message, the address, the device identifier, the application identifier and the application value.

According to another aspect of the invention, there is provided an apparatus for reception of a securely transmitted message by a recipient device the apparatus comprising:

(i) extraction means for extracting one or more of a device identifier, an application identifier and an application value from a received secure message;

(j) message generation means for generating, by a first process using the device identifier, the application identifier and the application value, a message value;

(k) secret value generating means for generating, according to a second process using the device identifier and the application identifier, one or more secret values known substantially only to an originating device and the one or more intended recipient devices of the message;

(l) message value combining means for combining the message value with the one or more secret values, to establish a secret message value;

(m) secure message extraction means for extracting a secure message block from the secure message; and (n) application means for applying the secret message value and the secure message block to a decoding process to form the securely transmitted message, this message having been securely transmitted by the originating device.

According to another aspect of the invention, there is provided a computer program product including a computer readable medium having recorded thereon a computer program for encoding and transmitting by an originating device of a secure message, the program comprising:

(a) message generating steps for generating, by a first process using a device identifier, an application identifier and an application value, a message value;

(b) first combining steps for combining the message value with one or more first secret values, said secret values being known substantially only to the originating device and one or more intended recipient devices of the message, to establish a secret message value;

(c) application steps for applying the secret message value and the message to encoding steps which perform an encoding process to form a secure message block; and (d) second combining steps for combining an address with the device identifier, the application identifier, the application value and the secure message block, to form a secure message for transmission, the secure message being decodable by the one or more of said intended recipient devices which thereby recover the message, the address, the device identifier, the application identifier and the application value.

According to another aspect of the invention, there is provided a computer program product including a computer readable medium having recorded thereon a computer program for reception of a securely transmitted message by a recipient device the program comprising:

(i) extraction steps for extracting one or more of a device identifier, an application identifier and an application value from a received secure message;

(j) message generation steps for generating, by a first process using the device identifier, the application identifier and the application value, a message value;

(k) secret value generation steps for generating, according to a second process using the device identifier and the application identifier, one or more secret values known substantially only to an originating device and the one or more intended recipient devices of the message;

(l) message value combining steps for combining the message value with the one or more secret values, to establish a secret message value;

(m) secure message block extraction steps for extracting a secure message block from the secure message; and (n) application steps for applying the secret message value and the secure message block to a decoding process to form the securely transmitted message, this message having been securely transmitted by the originating device.

According to another aspect of the invention, there is provided a system providing secure communications comprising an originating device and one or more receiving devices, wherein said originating device comprises an apparatus for encoding and transmitting a secure message, the originating device comprising:

(a) message generating means for generating, by a first process using a device identifier, an application identifier and an application value, a message value;

(b) first combining means for combining the message value with one or more first secret values, said secret values being known substantially only to the originating device and one or more intended recipient devices of the message, to establish a secret message value;

(c) application means for applying the secret message value and the message to an encoding means which performs an encoding process to form a secure message block; and (d) second combining means for combining an address with the device identifier, the application identifier, the application value and the secure message block, to form a secure message for transmission said secure message being decodable by the one or more of said intended recipient devices which thereby recover the message, the address, the device identifier, the application identifier and the application value;

and wherein a said receiving device comprises an apparatus for reception of a securely transmitted message, said receiving device comprising:

(e) extraction means for extracting one or more of a device identifier, an application identifier and an application value from a received secure message;

(f) message generation means for generating, by a first process using the device identifier, the application identifier and the application value, a message value;

(g) secret value generating means for generating, according to a second process using the device identifier and the application identifier, one or more secret values known substantially only to an originating device and the one or more intended recipient devices of the message;

(h) message value combining means for combining the message value with the one or more secret values, to establish a secret message value;

(i) secure message extraction means for extracting a secure message block from the secure message; and (j) application means for applying the secret message value and the secure message block to a decoding process to form the securely transmitted message, this message having been securely transmitted by the originating device.

BRIEF DESCRIPTION OF THE DRAWINGS

A number of embodiments of the invention are described with reference to the drawings, in which.

Appendix 1 shows a computer program for secure communication according to an embodiment of the invention.

DETAILED DESCRIPTION

The term "unique" is used herein in one of two ways. In the first instance, it is used as a label e.g. "Unique Application Value". In the second instance, it is used to indicate the manner of parameter value selection for a number of parameters. For example, "secret values are preferably unique values" is taken to mean that secret values are chosen in a manner as to minimise the likelihood that two secret values will have the same value.

Electronic network communications involve both originators of messages, and recipients of those messages. Some communication systems dealing with applications like e-mail handling, financial services, and directed research information acquisition involve a large number of individuals communicating uni-directionally and/or bi-directionally with a small number of servers or hosts. Systems of this type are characterised by communication paths which are "many to one" or "many to few".

Figure 1:
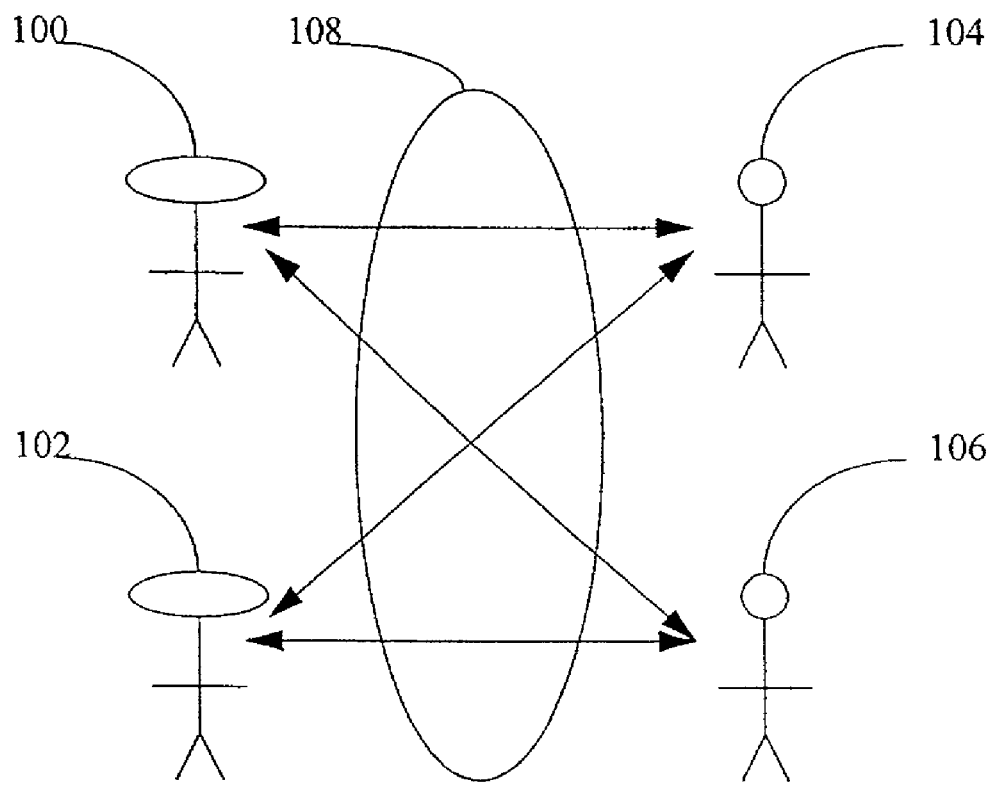
FIG. 1 depicts secure communication between Issuers and device-holders.

Turning to FIG. 1, an Issuer 100 communicates with a number of Device-holders 104 and 106 across a network 108. Another Issuer 102 communicates with the same device-holders 104 and 106, and with other device-holders (not shown) across the network 108.

Figure 2:
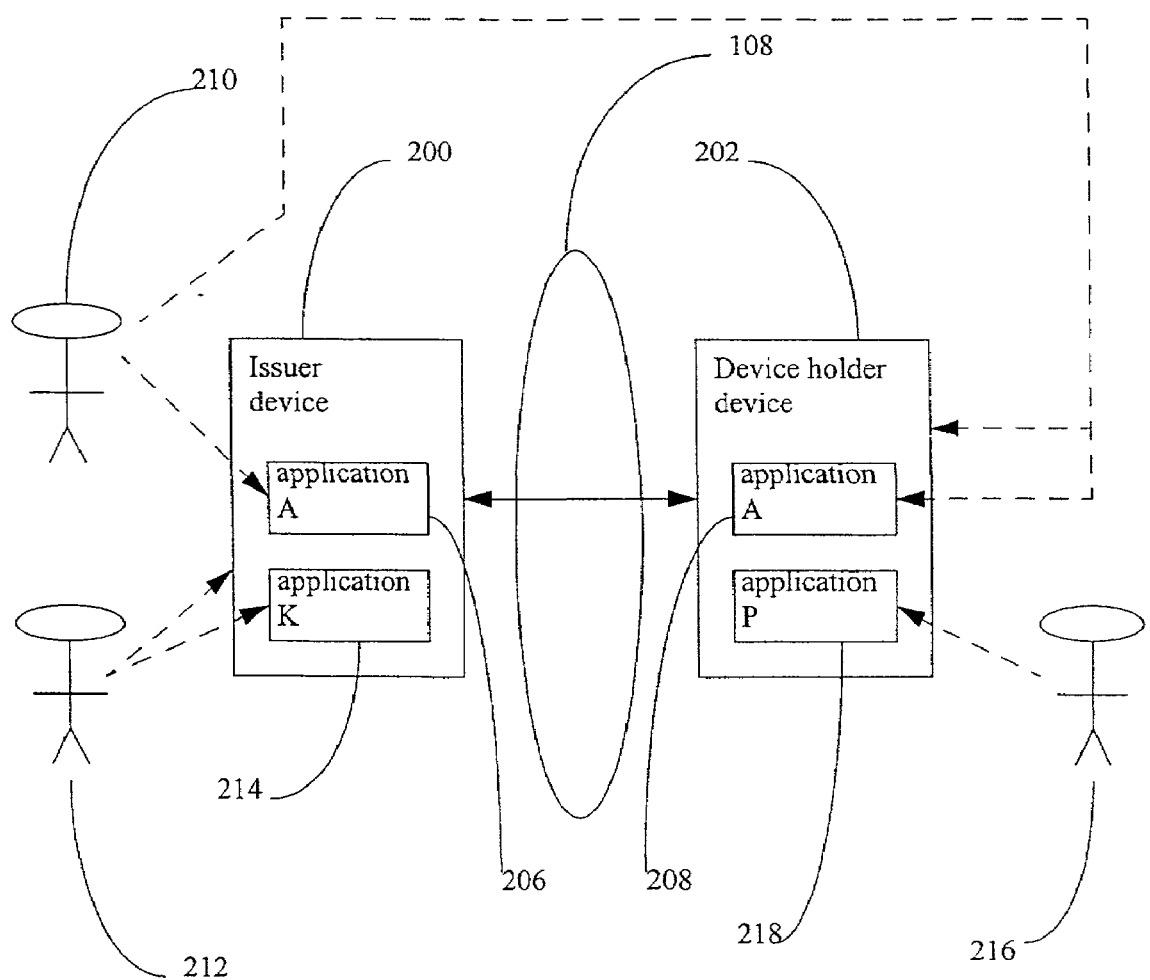
FIG. 2 depicts the sourcing of devices and device applications from different issuers.

FIG. 2 shows how the communication referred to in relation to FIG. 1 is performed by the Issuer 100 (see FIG. 1) using an Issuer device 200 to communicate with the device-holder 104 by means of the device-holder device 202. The Issuer device 200 communicates across the network 108 to the device holder 202 using corresponding applications 206 and 208 respectively which are incorporated into the respective devices 200 and 202. The Issuer device 200, the device-holder device 202, and the applications 206 and 208 are either proprietary or commercial products, and are generally available from different suppliers in the market. This requires that the applications 206, 208 and devices 200, 202 comply with appropriate interface and interworking standards. In the rest of the description, communication between issuer and device-holder and communication between issuer device and device-holder device are taken to have the same meaning unless a contrary intention is stated.

The Issuer device 200 and the device-holder device 202 ensure the confidentiality and integrity of communication, independent of the type of network infrastructure 108. They provide confidentiality and message integrity even in the event that messages are delayed, corrupted, or delivered in a different sequence to the one in which they were transmitted.

The Issuer device 200 communicates with device-holder device 202 for a variety of different purposes. These purposes include administrative functions such as exchanging logon ID/passwords and exchanging account information. They also include sending, and receiving electronic mail, sending and receiving purchase information in relation to a purchase, or transacting purchases. Each communication type is associated with a particular application in the Issuer device 200 and a corresponding application in the device-holder device 202. A suite of applications (e.g. 214 and 206) in the Issuer device 200 can be supplied as an integrated set of applications, or alternatively as modular software applications from different sources. The same applies in regard to a suite of applications in the device-holder device 202.

Figure 3:
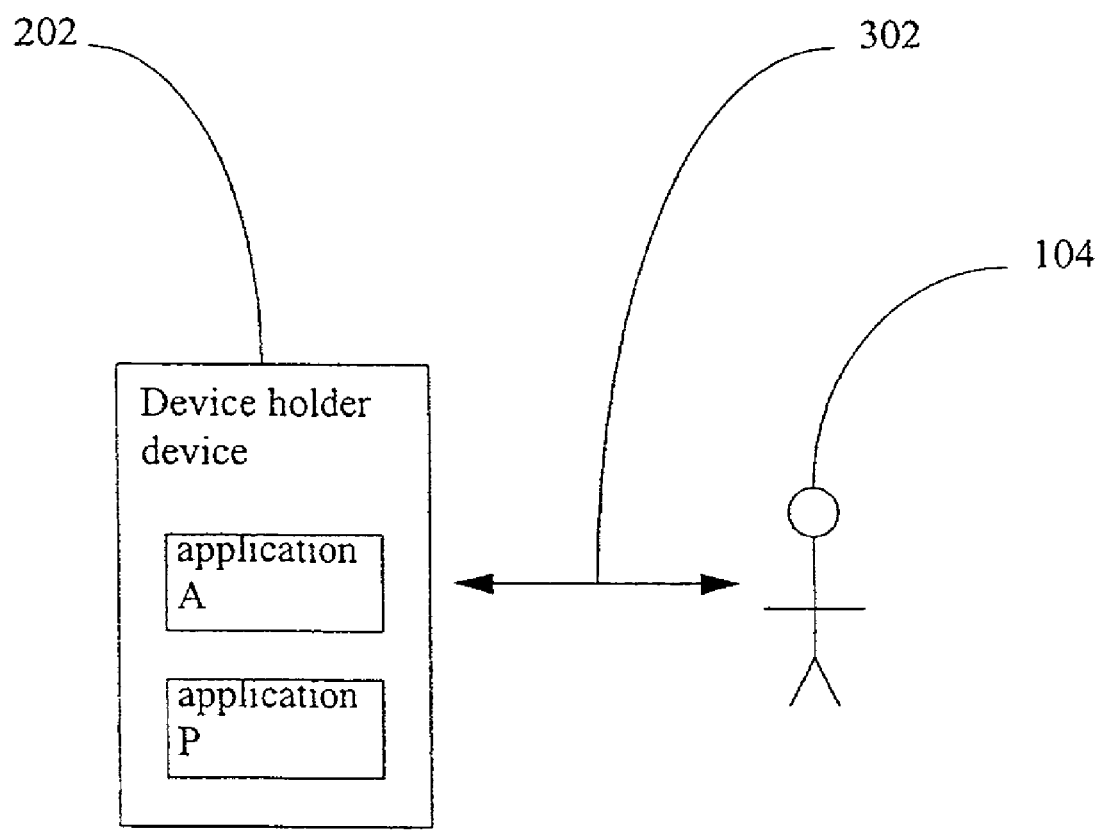
FIG. 3 depicts a device holder performing authentication in relation to a device.

FIG. 3 illustrates how a device-holder 104 can in some circumstances, typically at the issuer's discretion, be required to perform an authentication procedure, as depicted by arrow 302, in regard to the device-holder device 202. This authentication procedure 302 can, for example, take the form of an exchange of password identification, or can use a biometric identification procedure such as placing the device-holders thumb on a special purpose thumb-print sensor. Alternatively, passive authentication can be achieved by mere possession of the device-holder device 202.

Where required by the particular application (e.g. exemplified by 206, 208), the aforementioned authentication procedure provides authentication information which can be incorporated into the communication messages. For example, communications dealing with requests for health, financial or computer system access information commonly require, as a prerequisite to answering the request, a reliable indication that the information request has originated from a device and/or application which is known to, and authorised by, the information provider. Furthermore, the information provider must be sure that the device making the request is being used by a user who is in turn authorised to make such a request. In this case, the authentication information can be incorporated into each message, to enable the message recipient to assess the authentication status of a message at the time of receipt. The authentication or message identification information can be used for network performance assessment, in order to estimate the integrity and efficiency of the communication system, and the individual communication links. In addition, the authentication information can be used as a basis for establishing the origin, destination, sequence and timing of messages. This is usable, for example, in customer dispute resolution situations, as substantiating evidence.

The aggregate level of security provided by the Issuer device 200, the application (e.g 206 and 208), and the device-holder device 202 is specified by the Issuer 100, to comply with his requirements and those of the device-holders 104 and 106. The Issuer will normally specify a required level of security based upon risk management assessment of the Issuer's business requirements. Tamper-resistant card-reading terminals and smart-cards are an example of a particular issuer device 200 and associated device-holder device 202 respectively in the case, for example, where the Issuer is a bank, and the device-holder is a bank customer.

The Issuer device 200 and the device-holder device 202 (see FIG. 2) are generally arranged to erase sensitive data values held in storage if the devices are subjected to tampering or damage. Typically, in the case of multiple applications 214 and 206 being resident in the Issuer device 200 or device holder device 202, an operating system within the issuer device 200 provides secure access control to data on a per-application basis. The level of security associated with inter-application access varies with the type of messaging application, for example, financial or health applications being more security-intensive than lower priority e-mail massaging.

Figure 4:
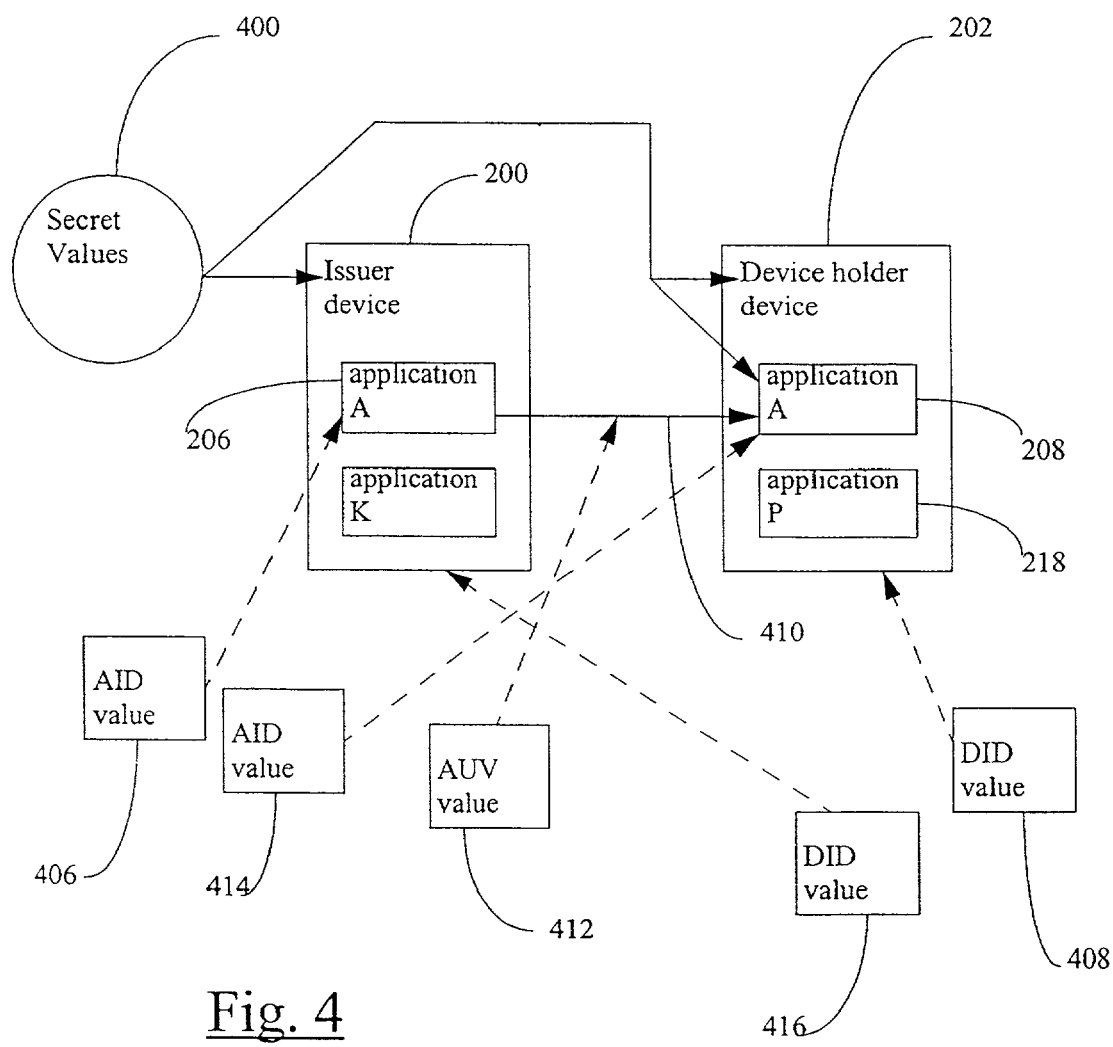
FIG. 4 illustrates incorporation of secret values into Issuer and device-holder devices.

Having regard to FIG. 4, the Issuer device 200 is able to store secret values 400 in a secure manner. The secret values 400 will typically be at least 64 bits long, but preferably will be 112 bits or greater in length (i.e. the length of a double key according to the digital encryption standard (DES), or other symmetric encryption process such as LOKI, IDEA, RC4 and so on). The secret values 400 being such length preclude practicable brute force attacks which could otherwise be feasibly used to deduce the secret values 400.

The Issuer device 200 and the device-holder device 202 are arranged to allow one or more secret values 400 known only to the Issuer's device 200 and the device-holders device 202 to be stored in both the Issuer device 200 and the device-holder device 202. Typically, two unique secret values 400 will be used, one for message origination, and the second for message reception. Other situations or applications however, only require a single secret value 400. An example of this is an application for secure identification, encryption and decryption of data or files for backup or external storage purposes, where a single device acts as both the originator 200 and recipient 202 at differing times.

Provision of distinct secret values 400 for each application (e.g. 206, 208) within a device (e.g 200, 202) provides for reliable and single valued indication of both the device and application that originate a particular message. The Issuer device 200 and the device-holder device 202 are engineered in a fashion as to preclude misuse of secret values 400.

The secret values 400 are preferably unique values. This ensures not only that particular applications have different secret values 400, but also that any secret value 400 has a low probability of being the same as secret values 400 used in any other device holder 202 or application e.g 218.

The corresponding applications 206 and 208 are assigned application identity values 406 and 414, to permit identification of an application or purpose for a particular message. This identification can vary between applications, or between versions of the same application. The application identity (406) can be either a numeric value (e.g "1, 2, 3, 4, 5, 6"), or a more descriptive text string (e.g. "ABC banking system", or, "ABC banking system logon step 1").

Each device-holder device 202 and issuer device 200 is allocated a device identifier 408,416 which might, for example, be a serial number. This provides a unique identifier for each device. The device identifier 408, 416 allows the issuer device to know which device-holder device originates a message.

The issuer device 200 maintains, in some secure fashion, a record of the device identifier 408, the relevant application identifier 414, and the secret values 400 associated with all the devices e.g. 202 and/or applications e.g. 208 issued by the Issuer. The Issuer device 200 stores multiple secret value sets, each set being specific to both a device and an application, while each application within a device will contain a secret value set. The Issuer stores information regarding both the devices which are registered to communicate with it, and the applications which the registered devices contain.

This is exemplified in the following table, which illustrates typical data maintained by the issuer device 200, illustrating how a number of different secret values $SV^s$, $SV^r$, $SV^i$ can be associated with a record set.

Devices can contain multiple applications, which communicate with this issuer. Thus device 123654 contains a first application entitled "Remote Access v1.01" and another application entitled "1098756".

Figure 5:
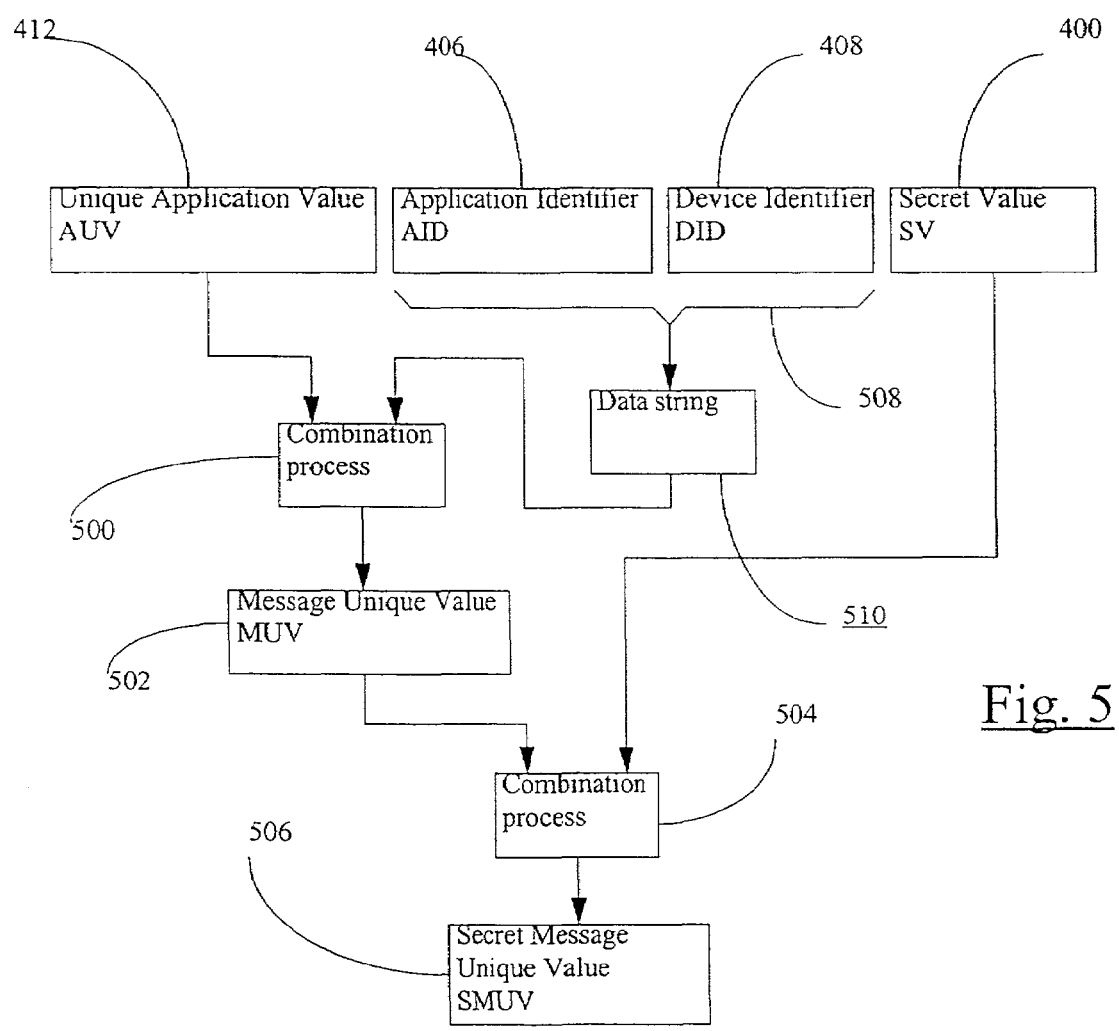
FIG. 5 illustrates a preferred embodiment for producing a secret message unique value.

FIG. 5 below illustrates how the secret value or, in the case shown in Table 1 the secret values, $SV^k$ are combined with the application identifier e.g. 406, 414, the device identifier e.g. 408, 416 and a message related value e.g. 412.

A single instance of the application 206 within the device 200 can require one or more secret values. Thus with reference to Table 1. application "Remote Access v1.01" requires a secret value $SV^s$ whose value is "10A6B1C8ED9F9" for ensuring confidentiality in the send direction. The same application further requires a secret value $SV^r$ whose value is "48009F1CCe203" for ensuring confidentiality in the receive direction.

Devices associate corresponding details on applications, secret values and those Issuers with which the device has been registered. Extracting the DID and AID fields from a received message enables the Issuer to retrieve the appropriate secret value(s). A device retrieves appropriate secret value(s) by virtue of the Issuer's DID and AID fields within a received message.

The application identifier 406 permits a message-originating device to tag a specific message with the identifier 406 when delivering it to a recipient device.

For auditing and indexing purposes an application-unique value 412 is assigned to each message transmitted. This application-unique value 412, when combined with the device identifier 416 and the application identifier 406, permits reliable indexing of every message within a system or network. This indexing is related to the message, the device, and the application. The application-unique value 412 can be a simple counter within the application 206 or the Issuer device 200. Alternatively, time and/or date information or a combination of the aforementioned parameters can be used. The range of the application-unique value 412 encompasses the expected working life (i.e. the total expected number of messages sent/received during the lifetime) of the device (e.g. 200) and the application (e.g. 206). A binary value of 32 bits or 10 decimal digits normally suffices for this purpose.

FIG. 5 illustrates a preferred embodiment of the message origination process. The Device Identifier 408 and the Application identifier 406 are joined as depicted by a curly bracket 508, to form one data string 510. Thereafter, the data string 510 and the unique application value 412 are combined in a process 500 to create a message unique value 502. The combination process 500 produces a message unique

TABLE 1

| DID | Application ID (AID) | Secret Value Send($SV^s$) | Secret Value Receive ($SV^r$) | Secret Value Integrity ($SV^i$) |
|---|---|---|---|---|
| 123653 | remote access v1.01 | 247EB4BC8EF52 | 2F667C42C2C02 | |
| 123654 | remote access v1.01 | 10A6B1C8ED9F9 | 48009F1CCE203 | |
| | 1098756 | 99A73E7D456A8 | | |
| 123655 | ABC savings account Cash Management v2.9 | 3C768B8A71C31 2906F8812A346 C459EAC53F55 | 4789239EFAAB1 387FEA1B4755C4 7E89564CA2313 | 2906F8812A34E C459EAC53F5A3 |
| 123656 | ABC savings account | 83E76FC890323 | 345F7898AC1F5 | 11FF045A67897 | value 502 which is individual to the specific input combination of the device identifier 408, the application identifier 406 and the unique application value 412. Cryptographic techniques such as symmetric encryption, using Cipher Block Chaining (BCB) or another cipher feedback mode, keyed hash functions, or hash functions such as SHA-1 and MD5 fulfil this required functionality. In contrast, exclusive OR (XOR) functions are generally not suitable, since the resulting message unique value 502 will not be unique. If a keyed function such as the symmetric key encryption based one way function is used, using the unique application value 412 as the key value will marginally increase the work factor for some forms of attack. The Device Identifier 408 and the Application Identifier 406 are normally concatenated before, or during, the combination process 500.

The message unique value 502 is combined with the secret value 400 in combination process 504 to form a secret message unique value 506. The secret message unique value 506 is substantially unique to the particular message, device and application. It is noted that the secret value 400 is logically associated with the device identifier 416 and application identifier 406.

The combination process 504 can be implemented using the symmetric encryption based one way functions used in the financial industry, and/or hash functions such as SHA-1 and MD5. The use of non-reversible combination processes 504 is preferred to encryption processes, in order to isolate the secret value 400 from possible recovery due to brute force attacks, should one or more secret message unique values 506 be compromised in any manner.

Figure 6:
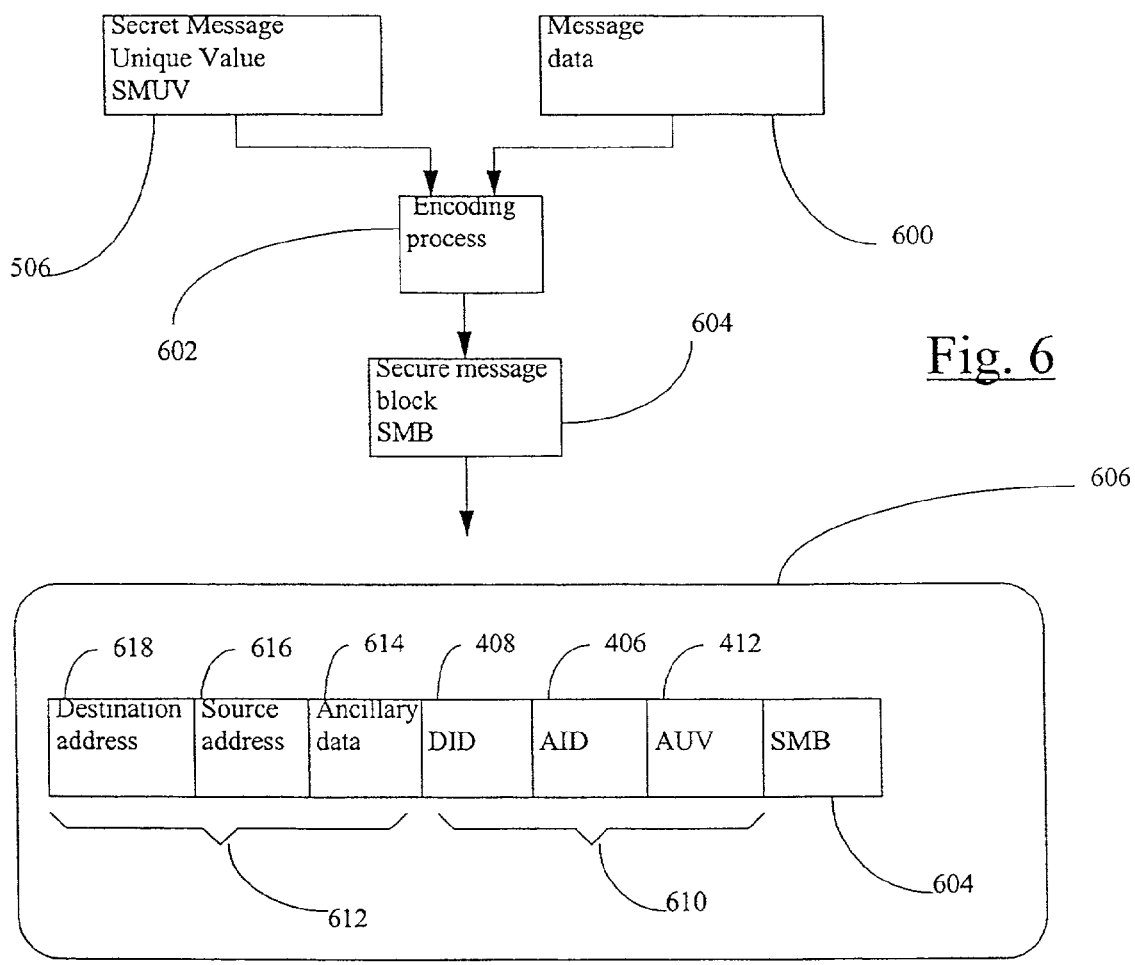
FIG. 6 depicts a preferred embodiment for production of a transmission data block.

Turning to FIG. 6, the secret message unique value 506 is combined with message data 600 in an encoding process 602. This process 602 can be selected appropriately to provide symmetric key encryption for confidentiality, or for providing a message integrity mechanism, such as a Message Authentication Code (MAC) or keyed hash function, or simply as a secret one-time value for use within a higher level protocol. More details on MACs can be found in Australian Standard 2805 and in ANSI X9 Standards and similar documents.

Examples of higher level protocol usage include using the secret message unique value as a data value passed through a separate key management protocol, such as those used in SSL (Secure Socket Layer), AS 2805, ISO 8583, and S/Mime, or using the secret message unique value as a seed value in a random number generation process.

The encoding process 602 outputs a secure message block 604 which is unique to the message 600, device 200 and application 206. This encoding process 602 binds the device identifier 416, the application identifier 406, the application unique value 412, and the secret values 400 to the message 600.

Message data or content is formatted according to the needs of the issuer and device holder. Message length and/or content can be arbitrarily arranged. Encryption and/or message integrity functions are incorporated together with the message data as exemplified by a transmission data block 606. The transmission data block 606 takes the form of three major components, namely the secure message block 604, control data 610, and addressing data 612. The control data 610 consists of the device identifier 408, the application identifier 406, and the unique application value 412. The addressing data 612 consists of a destination address 618, a source address 616, and optionally, ancillary data 614. The format of the transmission data block 606 is determined by the Issuer 100 (see FIG. 1).

Considering FIG. 6 with reference to FIG. 1, the secure message block 604 is opaque, that is indecipherable, to all network entities apart from the intended recipient e.g. 104.

The format and arrangement of the addressing data 612 is related to network functionality and not directly to the messaging functions of authentication and integrity assurance. Addressing data 612 is thus specific to the purpose, network and processing devices being employed by the Issuer device 200 and device-holder device 202.

This arrangement also allows the same device identifier 408 to be used at multiple network addresses 618, 616. Alternatively, redundant issuer devices each with a distinct device identifier can be accessed at the same network address.

Figure 6A:
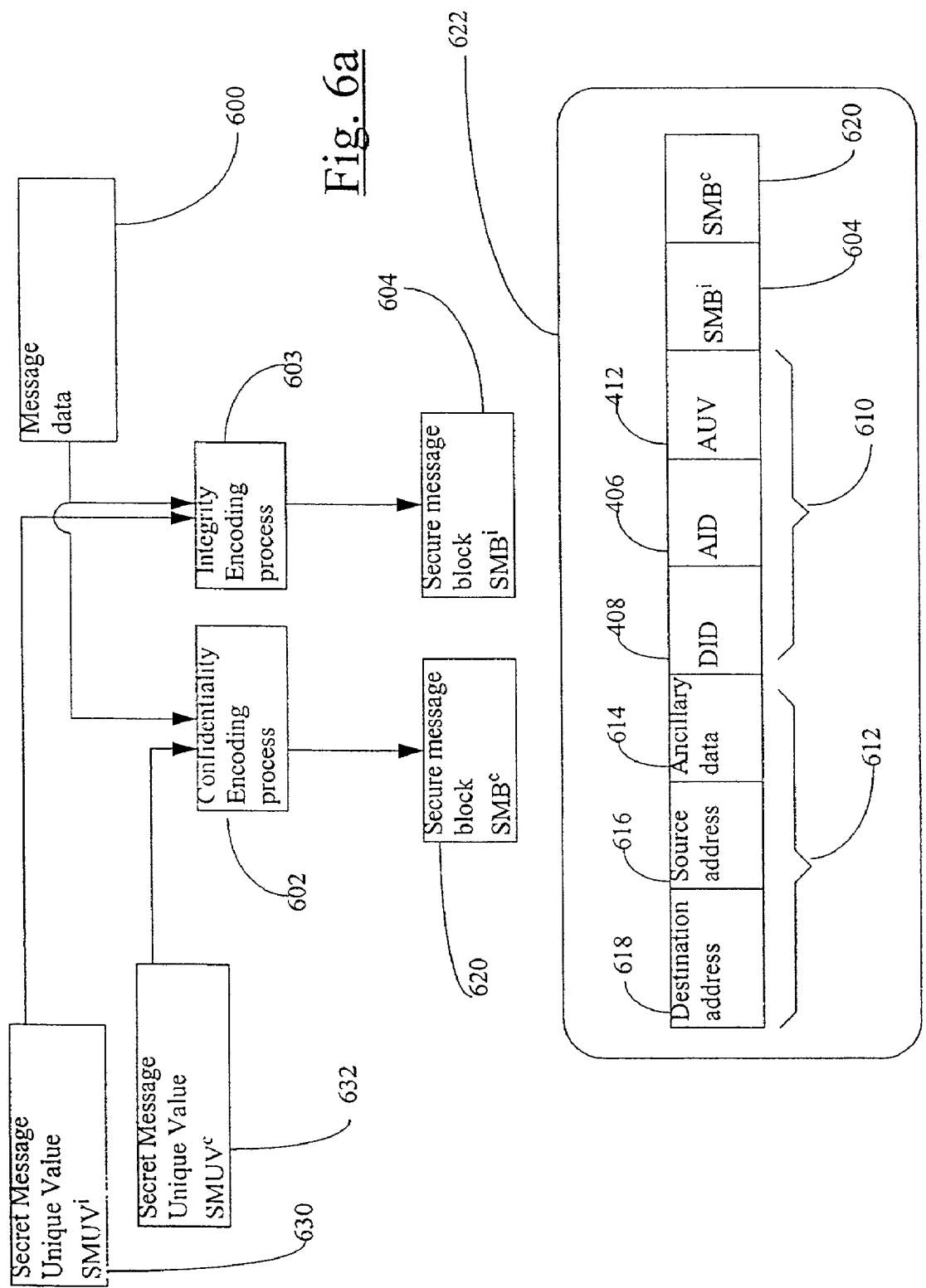
FIG. 6a depicts an embodiment for production of a transmission data block with confidentiality and integrity protection.

FIG. 6a depicts a situation where both confidentiality and integrity protection are required. In a first embodiment, two encoding processes 602 and 603 are applied in parallel, process 602 for confidentiality and process 603 for integrity. Two distinct secret values $SV^c$ (for confidentiality) and $SV^i$ (for integrity) are used to produce two secret message unique values 632 and 630 respectively. These are applied to the corresponding processes 602 and 603 together with message data 600 to produce two secret message blocks 620 and 604 respectively. The transmission data block 622 is then constructed to contain the two secret message blocks 604 and 620. Symmetric key encryption can be used for confidentiality, and Message Authentication Code (MAC) or keyed hash function can be used for integrity.

In a second embodiment, still having regard to FIG. 6a, if both confidentiality and integrity are required, the first secret value $SV^c$ is used to produce the secret message value 632 using process 504 (see FIG. 5). The secret message value 632 is then combined with message data 600 in confidentiality encoding process 602 to produce the secure message block 620 and thereafter, a transmission data block. The second secret value $SV^i$ is then used to produce the secret message value 630 using process 504 (see FIG. 5). Thereafter, the secret message value 630 is encoded in integrity encoding process 603 together with the aforementioned transmission data block to produce the secure message block 604. This is then used to form a transmission data block which has been iteratively encoded to provide both confidentiality and integrity protection.

Figure 6B:
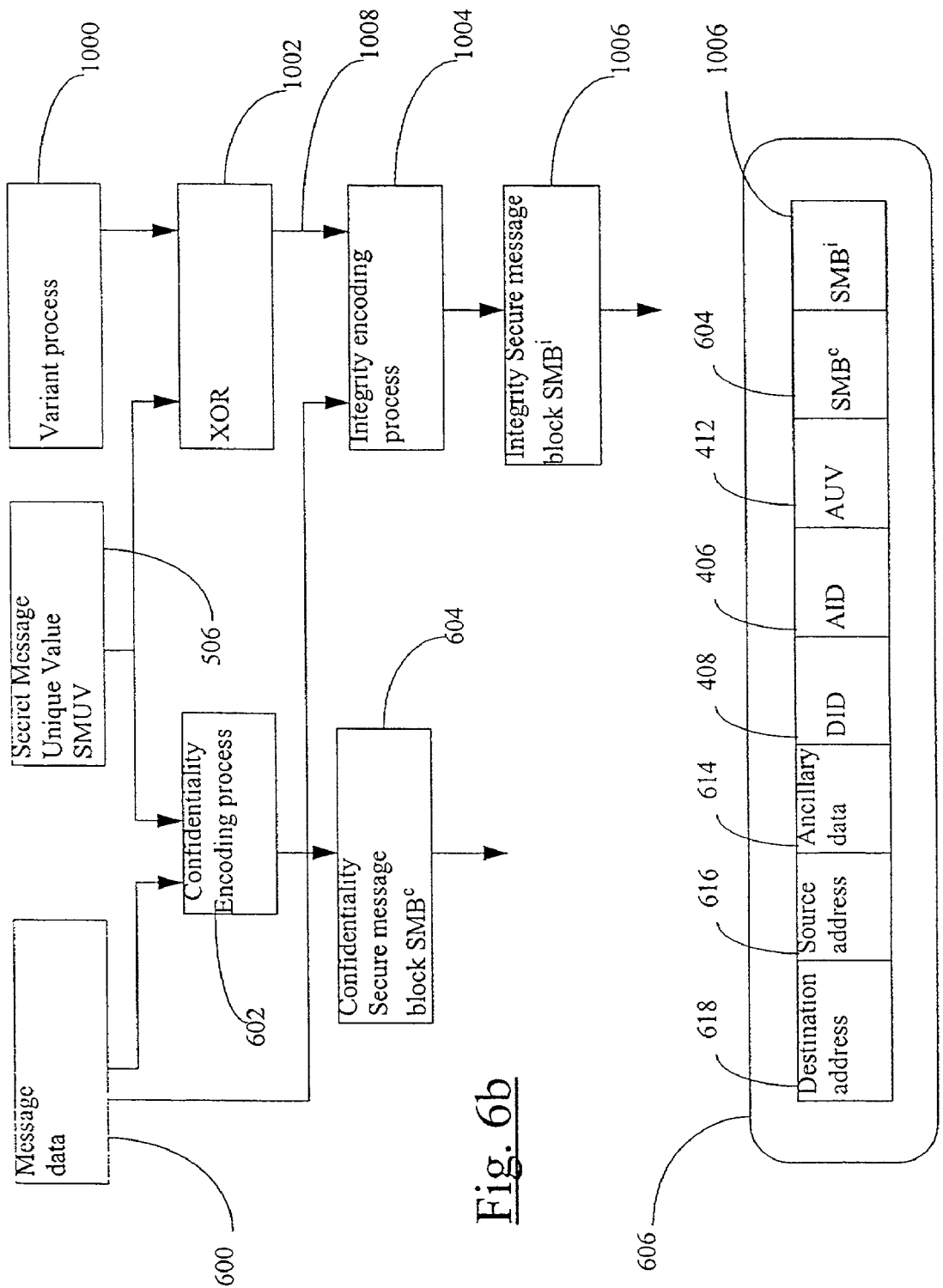
FIG. 6b depicts another embodiment for production of a transmission data block with confidentiality and integrity protection.

Turning to FIG. 6b, in a third embodiment where both confidentiality and integrity are required, the message data 600 is combined with the secret message value 506 in the confidentiality encoding process 602 to form a confidentiality secure message block 604. The same secret message value 506 is in parallel combined with a MAC Variant 1000 in XOR process 1002 to output an integrity secret message value 1008. This secret message value 1008 is then combined with the message data 600 in the integrity encoding process 1004 to form an integrity secure message block 1006. The confidentiality secure message block 604 and the integrity secure message block 1006 are then incorporated into transmission data block 606. MAC Variants are described in AS2805, ANSIX9, and similar standards.

Where both confidentiality and integrity protection are required, the sequence of processing may be decided according to the needs of the issuer. Thus, processing for confidentiality protection may be applied prior to processing relating to integrity protection, or alternatively, the processing may be performed in the reverse order.

Figure 7:
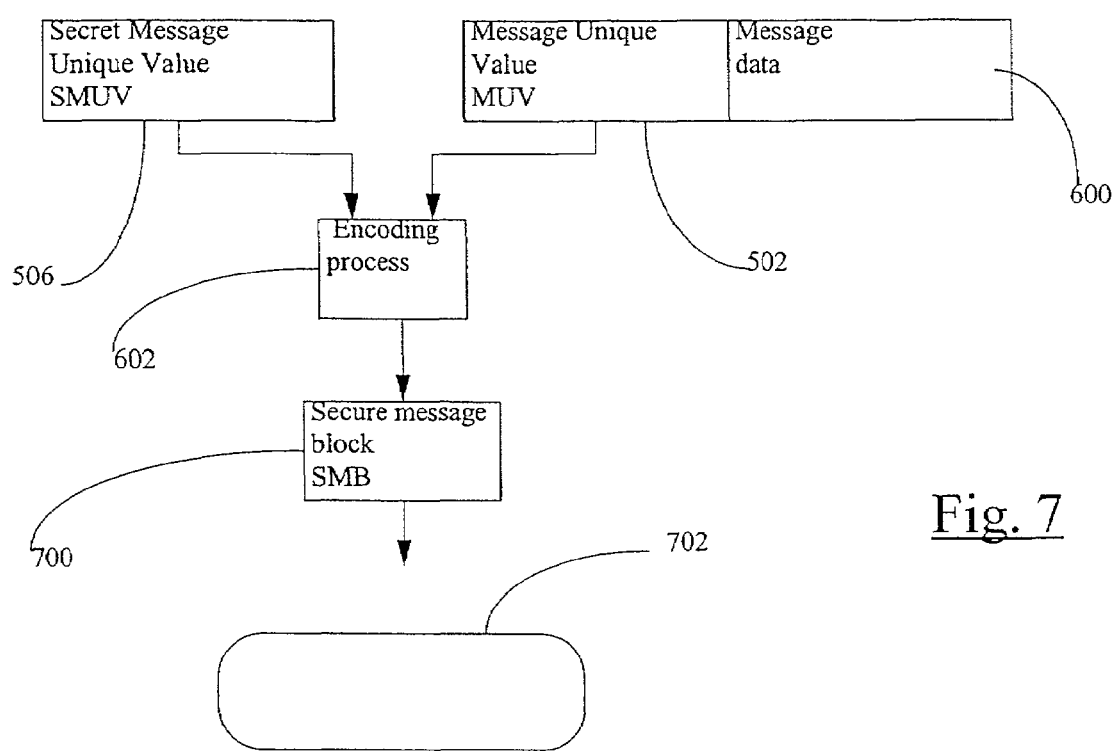
FIG. 7 depicts another embodiment for production of a transmission data block.

FIG. 7 illustrates another embodiment whereby the secret message unique value 506 is combined with message data 600 and the message unique value 502 in encoding process 602 to produce the secure message block 700 and thereafter to form transmission data block 702. This enables the message recipient to detect whether the incoming transmission data block 702 has been altered or corrupted during transmission, without performing a complete message reception procedure, and also allows utilisation of partially intact messages.

Figure 8:
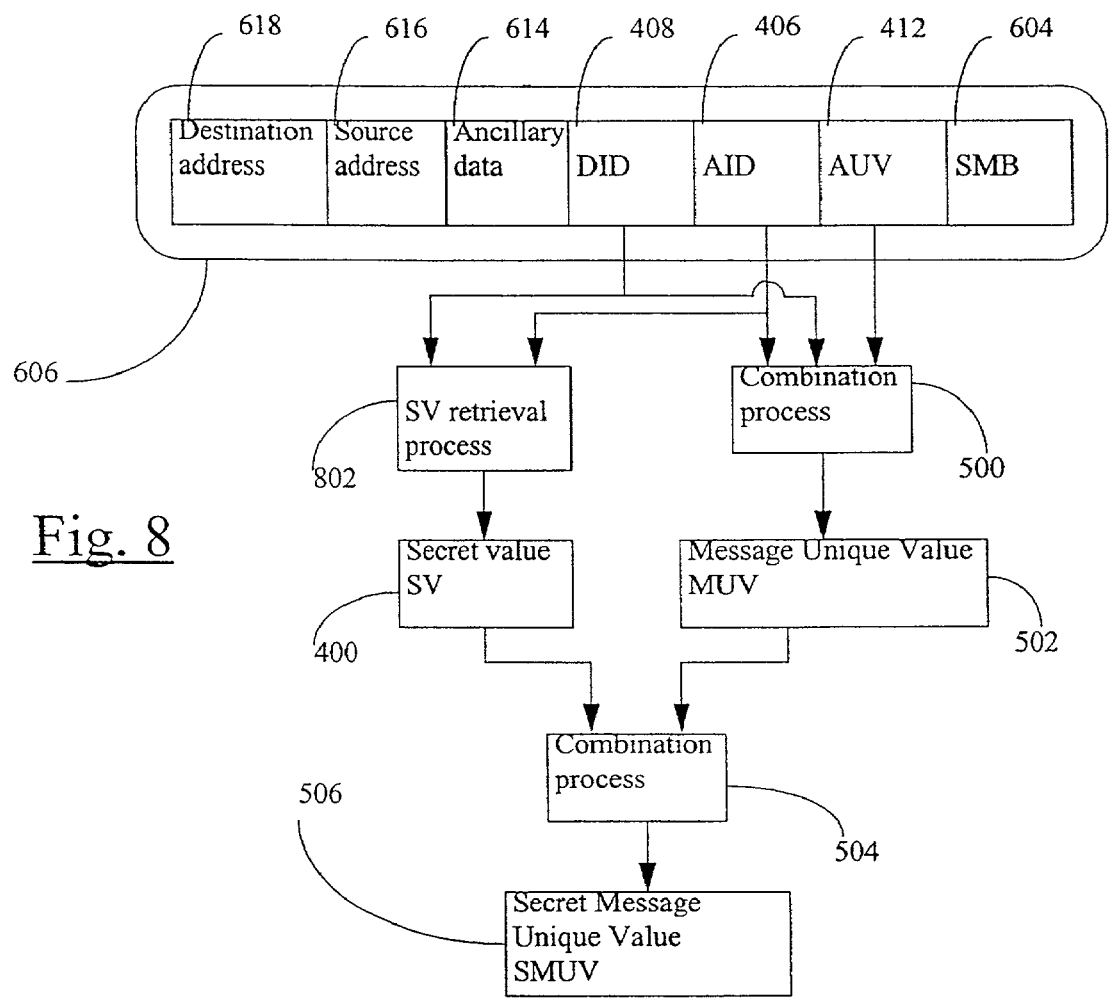
FIG. 8 illustrates a preferred embodiment for reception of the secret message unique value.

FIG. 8 illustrates a preferred embodiment which relates to decoding of the transmission data block 606. The application unique value 412, Device Identifier 408, and application identifier 406 are extracted from the incoming transmission data block 606, and combined in the process 500 to recreate the message unique value 502. The combination process 500 is the identical process used in the message transmission process as described in FIG. 5.

The device identifier 408 and the application identifier 406 are extracted from the transmission data block 606 and used to retrieve the appropriate secret value 400 by means of a secret value retrieval process 802.

The recreated message unique value 502 is combined with the retrieved secret value 400 in the combination process 504, in order to derive the secret message unique value 506. The combination process 504 is identical to the process utilised to combine the message unique value 502 and the secret value 400 in the transmission process described in FIG. 5.

Figure 9:
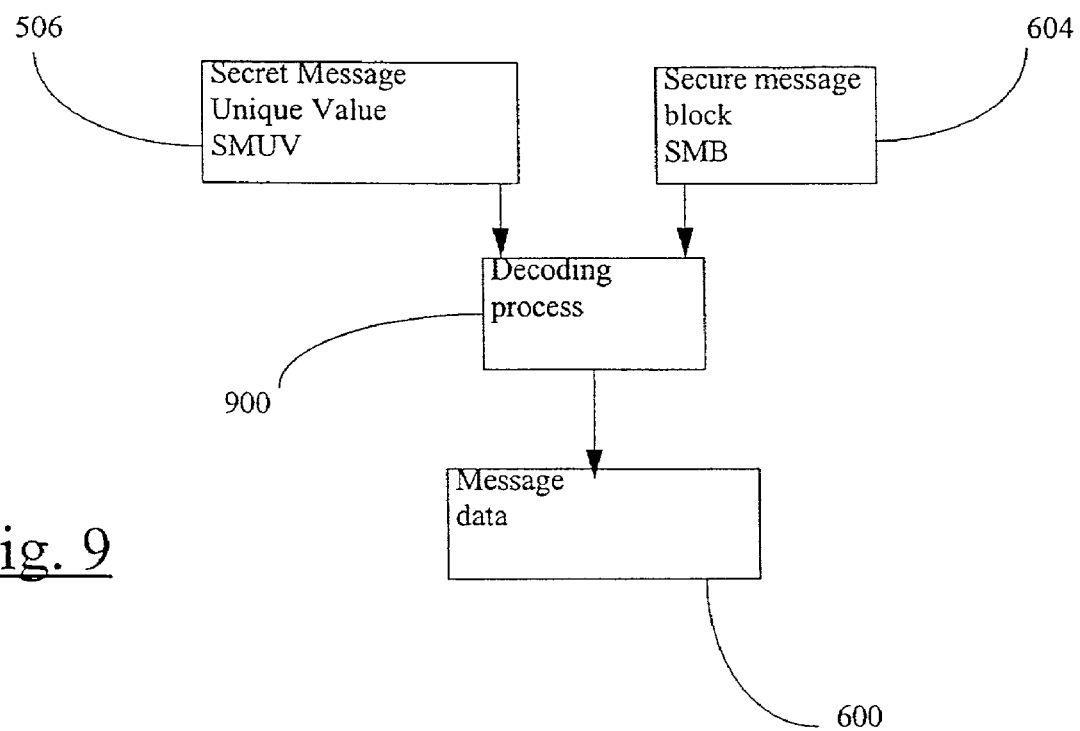
FIG. 9 illustrates a decoding process for recovery of the message.

Turning to FIG. 9, the secret message unique value 506 is utilised to decode the secure message block 604 in a decoding process 900, in order to produce the original message data 600. The decoding process 900 is the inverse process to the encoding process 602 (see FIG. 6). Thus if the encoding process 602 implemented symmetric key encryption, i.e. related to confidentiality, then the decoding process 900 decrypts the secure message block 604 using the unique value 506. If the encoding process 602 (see FIG. 6) implemented a message integrity mechanism such as a MAC or keyed hash function, then the decoding process 900 verifies the integrity of the secret message block 604 against message corruption or tampering, using MAC or keyed hash techniques, or both, as applicable.

Where the message unique value 502 is included with message data 600 in forming the secure message block 700 (see FIG. 7), application of the secret message unique value 506 to the secure message block 604 which contains the transmitted message unique value 502 in decoding process 900 allows detection of errors in the transmission data block 606 if it contains errors in the control data 610 (see FIG. 6) and parts of the secure message block 604.

Thus the message recipient device 202 and application (e.g. 208) utilise publicly disclosed items of information transmitted within the transmission data block 606 and one or more shared secret values 400 to uniquely identify the contents of the transmission data block 606.

Any other receiving entity with access to the network 108 and having authorised access to appropriate secret values 400 or secret message unique value 506 can also identify a corresponding transmission data block 606, and the incorporated destination device and/or application for purposes of metering, charging, quality control or law enforcement purposes. Where only the secret message unique value 506 has been provided for these purposes, prior and subsequent messages which use the secret value 400 are not compromised.

Figure 10:
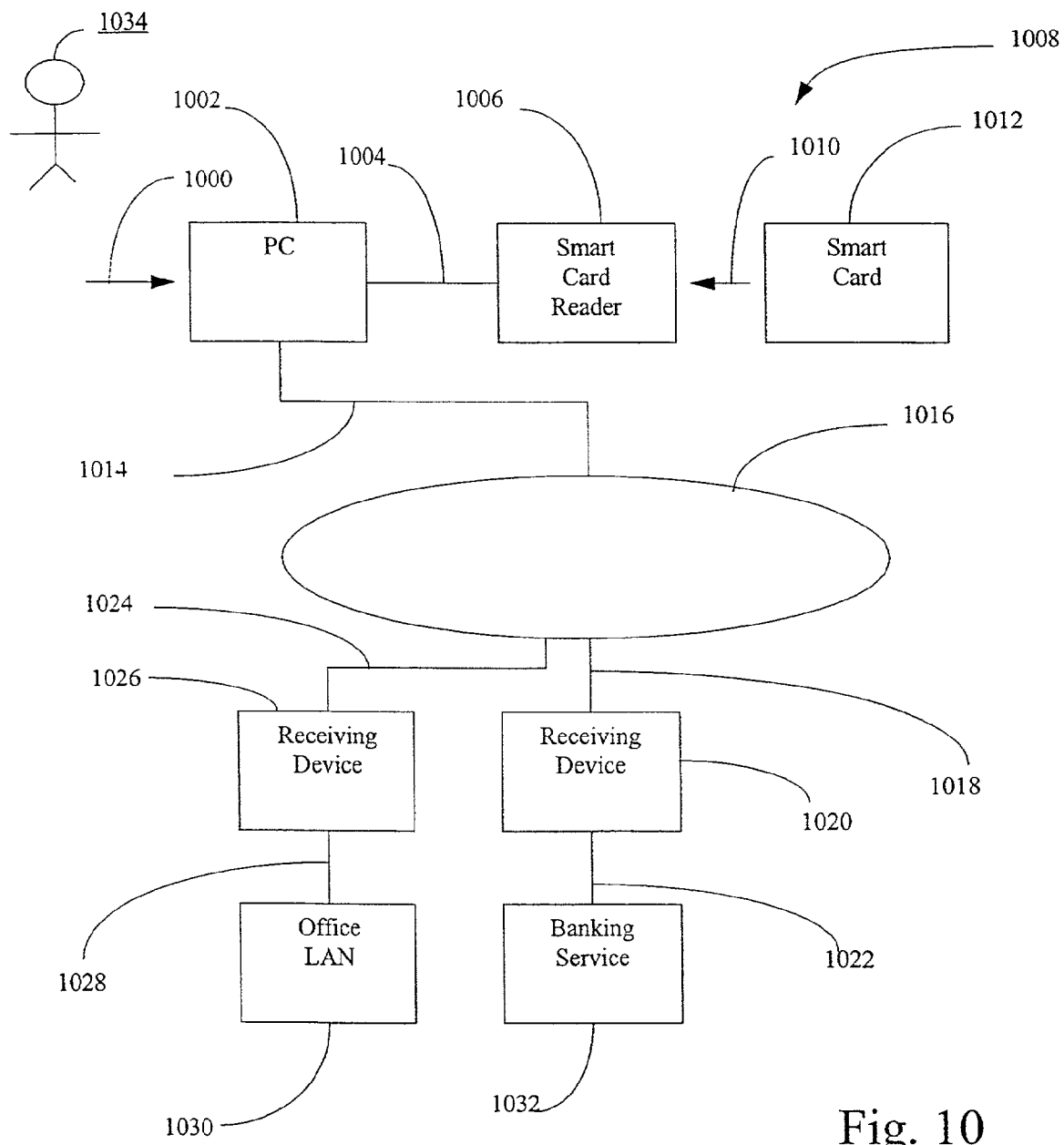
FIG. 10 depicts secure communication between a customer, a banking service and an office LAN.

FIG. 10 depicts a user 1034 directing a personal computer (PC) 1002 by means of a user interface depicted by an arrow 1000. The user 1034 has previously inserted a smart card 1012 as depicted by an arrow 1010 into a smart card reader 1006, which is connected to the PC 1002 by a data connection 1004. The smart card 1012 has, incorporated therein, the appropriate software applications to facilitate secure communications as previously described (e.g. in relation to FIGS. 5, 6, 8 and 9) between the user 1034 and, in the present Figure, a banking service 1032, and also, the user's office LAN 1030. The transmitted communication, secured by means of the interaction between the PC 1002 and the smart card 1012 is carried between the PC 1002 and the network 1016 by means of a data connection 1014. Thereafter, the communication is carried between the network 1016 and a receiving device 1020 by means of a data connection 1018, and thereafter, transferred by a data connection 1022 to a banking service 1032. In the case of the customer 1034 communicating with a bank, it is likely that the receiving device 1020 will be an integral part of the banking facility, and co-located with the banking service 1032. As previously noted, the process by which the user message is securely transmitted is described, for example, in FIGS. 5 and 6. The reception and decoding of the secure message is described, for example, in FIGS. 7 and 8.

A specific application identifier (406) is associated with the communications between the user 1034 and the banking service 1032. A different application identifier, also contained on the smart card 1012 in the present case, enables the user to securely communicate with his office LAN 1030. In this latter case, the secure message transferred to the network 1016 from the PC 1002 over the data connection 1014 is conveyed by a data connection 1024 to a second receiving device 1026, this being located in the user's office. From the receiving device 1026, which decodes the secure message in accordance with the process described, for example, in FIGS. 8 and 9, the secure message is conveyed by a data connection 1028 to the office LAN 1030. From a practical perspective, secure communications between the user 1034 and the banking service 1032, are used for transactions ranging from initial log on and password hand shaking between the banking service 1032 and the user 1034, through to other banking transactions such as reading an account balance, transferring funds and so on. In the second example of secure communications between the user and the office LAN 1030, secure communications would be used in particular in relation to initial log on and password hand shaking, as well as subsequent communications between the user and various file servers connected to the office LAN 1030.

Turning again to the issue of banking services, the receiving device is, as previously stated, situated in the bank itself. The bank would, in the present case have programmed the smart card 1012 with the appropriate software to enable the customer to communicate securely with the bank. Alternatively, the requisite programming of the smart card 1012 can be performed by a third party (not explicitly shown), who in that case also provides the necessary programming of the smart card 1012 to enable secure communications between the user and the office LAN 1030. It is apparent, therefore, that the requisite programming of the smart card 1012 can be carried out by a variety of issuers, using a wide variety of commercial arrangements, as previously described in relation to FIGS. 1 and 2. The issuers, in general, build and maintain receiving devices 1026, 1020 and "issue" the software applications to the smart card 1012.

Figure 11:
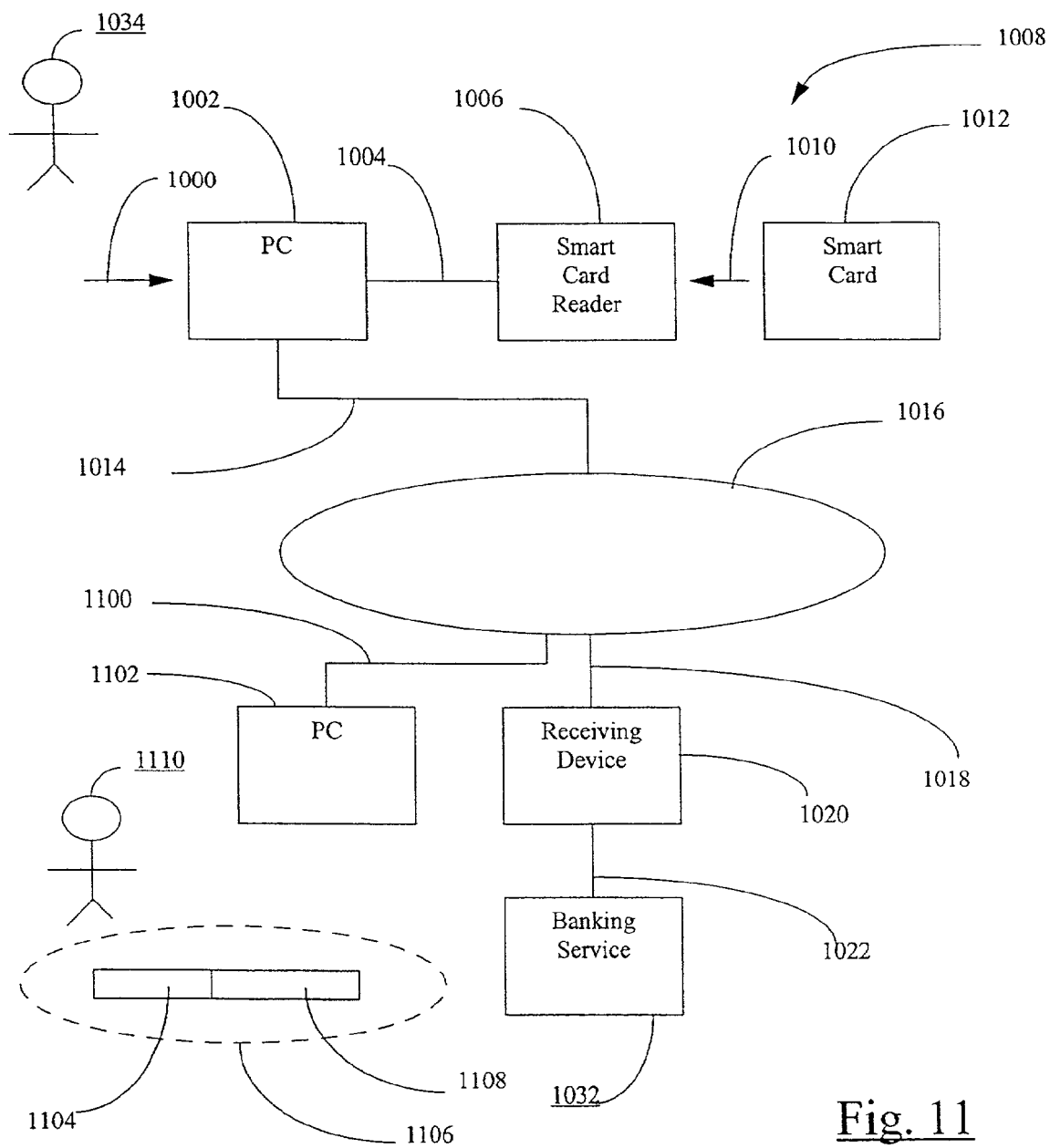
FIG. 11 shows electronic commerce between a customer, a merchant and a banking service.

FIG. 11 shows a different situation, in which the same user 1034 of PC 1002 engages in electronic commerce with a merchant 1110 having a PC 1102, this PC 1102 being connected to the network 1016 by a data connection 1100. The user 1034 of the PC 1002 sends a composite message shown in an insert 1106, this message comprising order details 1104 for an item, and a secure message payment authorisation segment 1108. The user 1034 and the merchant 1110 communicate by means of PCs 1002 and 1102 respectively, having arrived at a contract for sale in accordance with an interchange of preliminary messages (not shown), and finally the purchase order information 1104. Thereafter, the merchant 1110 transfers the secure purchase authorisation message 1108 to the banking service 1032, noting that the merchant 1110 does not have the ability to decode, and by implication to tamper with, the authorisation message 1108. The merchant 1110 is able merely to transparently transfer the purchasing authorisation 1108 by means of his PC 1102, and thereafter the data connection 1100, the network 1016, and the data connection 1018, to the receiving device 1020 which falls within the domain of the bank. The bank is able to decode the secure authorisation 1108, and by passing this to the banking service 1032 using the data connection 1022, is able to authorise transfer of the requisite funds to the merchants account.

The foregoing describes only some embodiments of the present invention, and modifications obvious to those skilled in the art, can be made thereto without departing from the scope of the invention. Thus, for example, originating devices can include PC/smart cards, mobile telephones, TV set top boxes, TV cable modems, personal digital assistants and the like.

APPENDIX 1

Computer Code for Secure Communications

```
Start Program, mode=ENCODE
Obtain DID, AppID from input parameters
Use DID, AppID, to retrieve MACSecretKey from key-file
  Start Combine for MAC
  CBC encrypt DID concatenated with AppID -> temp_variable1
  CBC encrypt MessageID using temp_variable1
  Output=Secret Message Variable for MAC generation
  End Combine for MAC
MAC input file using "Secret Message Variable for MAC generation" as key -> temp_mac
Write DID, AID, Message ID to output file
Write temp_mac to output file
Use DID, AppID, to retrieve EncryptSecretKey from key-file
  Start Combine for Encrypt
  CBC encrypt DID concatenated with AppID -> temp_variable1
  CBC encrypt MessageID using temp_variable1 -> temp_variable2
  CBC encrypt EncryptSecretKey using temp_variable2
  Output=Secret Message Variable for Encrypt
  End Combine for Encrypt
Encrypt input file using "Secret Message Variable for Encrypt" as key -> temp_data
Write input file length to output file
Write encrypted data length to output file
Write temp data to output file
Clear sensitive memory locations
Close input, output files
End program
Start Program, mode=DECODE
Obtain DID, AppID from input parameters
Use DID, AppID, to retrieve EncryptSecretKey from key-file
  Start Combine for Encrypt
  CBC encrypt DID concatenated with AppID -> temp_variable1
  CBC encrypt MessageID using temp_variable1 -> temp_variable2
  CBC encrypt temp_variable2 using EncryptSecretKey as key
  Output=Secret Message Variable for Encrypt
  End Combine for Encrypt
Decrypt input file using "Secret Message Variable for Encrypt" as key -> temp_data
Adjust temp_data length to true file length
Use DID, AppID, to retrieve MACSecretKey from key-file
  Start Combine for MAC
  CBC encrypt DID concatenated with AppID -> temp_variable1
  CBC encrypt MessageID using temp_variable1 -> temp_variable2
  CBC encrypt temp_variable2 using MACSecretKey as key
  Output=Secret Message Variable for MAC generation
  End Combine for MAC
MAC temp_data using "Secret Message Variable for MAC generation" as key -> temp_mac
Compare temp_mac to value in input file
  If Ok, proceed,
  Else indicate an error, then error, abort
Write temp_data to output file
Clear sensitive memory locations
Close input, output files
End program
```

The invention claimed is:

1. A method for securely encoding and transmitting a message by an originating device to one of a plurality of recipient devices, said message being associated with a particular one of a plurality of applications running on the originating device, the method comprising the steps of:

(a) determining a device identifier for the originating device, and an application identifier for each of the plurality of applications thereby forming a plurality of device-identifier/application identifier pairs;

(b) associating a secret value with each device identifier/application-identifier pair;

(c) wherein each said secret value is known to the originating device and to one of the recipient devices;

(d) generating a message value by a first process, using the device identifier, a particular application identifier and an application value, said application value indexing said message;

(e) combining the message value with said secret value associated with the particular application identifier to establish a corresponding secret message value;

(f) applying the secret message value and the message to an encoding process to form a secure message block; and (g) combining the device identifier, the application identifier, the application value and the secure message block, to form a secure message for transmission, said secure message being decodable, dependent upon the device identifier, the particular application identifier and the application value which are outside the received secure message block, by said recipient device to which said secret value associated with the particular application identifier is known, said recipient device thereby recovering the message, the device identifier, the particular application identifier and the application value.

2. A method according to claim 1, wherein an association of the device identifier, the application identifier, and the application value substantially uniquely identifies the originating device and a purpose of one or more of the message and the application, and establishes an identifier for the message, said message identifier being bound with the message content by virtue of the encoding process.

3. A method according to claim 1, wherein the encoding process in step (f) comprises one or more of:
   a symmetric encryption process;
   an integrity process using one of keyed hash and symmetric encryption techniques;
   a process including both symmetric encryption and keyed integrity; and
   including the secret message value in a higher level messaging protocol.

4. A method for reception of a securely transmitted message by a recipient device, the recipient device being one of a plurality of recipient devices adapted to receive a message from an originating device, said message being associated with a particular one of a plurality of applications running on the originating device, the method comprising the steps of:
   (i) extracting one or more of a device identifier, an application identifier and an application value from a received secure message having a secure message block, said one or more of the device identifier, the application identifier, and the application value being outside the secure message block, said application value indexing said message;
   (j) generating by a first process using the device identifier, the application identifier and the application value a message value;
   (k) generating, according to a second process using the device identifier and the application identifier a secret value known only to the originating device and the recipient device;
   (l) combining the message value with the secret value, to establish a secret message value;
   (m) extracting a secure message block from the received secure message; and
   (n) applying the secret message value and the secure message block to a decoding process to form the securely transmitted message, this message having been securely transmitted by the originating device.

5. A method for reception according to claim 4, wherein:
   a plurality of applications are running on the recipient device; and
   the application identifier extracted in the extracting step (i) is used to identify one of the applications running on the recipient device, said identified application being adapted to process the securely transmitted message decoded in step (n).

6. An originating device for securely encoding and transmitting a message to one of a plurality of recipient devices, the message being associated with a particular one of a plurality of applications running on the originating device, the originating device comprising:
   (a) means for determining a device identifier for the originating device, and an application identifier for each of the plurality of applications thereby forming a plurality of device-identifier/application identifier pairs;
   (b) means for associating a secret value with each device-identifier/application-identifier pair;
   (c) wherein each said secret value is known to the originating device and to one of the recipient devices;
   (d) means for generating a message value by a first process, using the device identifier, a particular said application identifier and an application value said application value indexing said message;
   (e) means for combining the message value with a said secret value associated with the particular application identifier to establish a corresponding secret message value;
   (f) means for applying the secret message value and the message to an encoding process to form a secure message block; and
   (g) means for combining the device identifier the particular application identifier the application value and the secure message block to form a secure message for transmission, said secure message being decodable, dependent upon the device identifier the particular application identifier and the application value which are outside the received secure message block, by a said recipient device to which said secret value associated with the particular application identifier is known, said recipient device thereby recovering the message, the device identifier, the particular application identifier and the application value.

7. A device according to claim 6, wherein the encoding means comprises one or more of:
   (e) a symmetric encryption means;
   (f) an integrity processing means using keyed hash or symmetric encryption techniques;
   (g) a keyed-symmetric processing means performing symmetric encryption and ensuring keyed integrity; and
   (h) encapsulation means for including the secret message value in a higher level messaging protocol.

8. A computer program product including a computer readable medium having recorded thereon a computer program for directing an originating device to securely encode and transmit a secure message to one of a plurality of recipient devices, said message being associated with a particular one of a plurality of applications running on the originating device, the program comprising:
   (a) code for determining a device identifier for the originating device and an application identifier for each of the plurality of applications thereby forming a plurality of device-identifier/application identifier pairs;
   (b) code for associating a secret value with each device-identifier/application-identifier pair,
   (c) wherein each said secret value is known to the originating device and to a said one of the recipient devices;
   (d) code for generating a message value by a first process, using the device identifier, a particular said application identifier and an application value said application value indexing said message;
   (e) code for combining the message value with said secret value associated with the particular application identifier to establish a corresponding secret message value;
   (f) code for applying the secret message value and the message to an encoding process to form a secure message block; and
   (g) code for combining the device identifier the particular application identifier the application value and the secure message block to form a secure message for transmission, said secure message being decodable, dependent upon the device identifier the particular application identifier and the application value which are outside the received secure message block, by said recipient device to which said secret value associated with the particular application identifier is known, said recipient device thereby recovering the message, the device identifier, the particular application identifier and the application value.

9. A computer program product according to claim 8 whereby the encoding steps in step (f) comprise one or more of:
symmetric encryption steps;
integrity processing steps using one of keyed hash and symmetric encryption techniques;
keyed-symmetric steps performing symmetric encryption and ensuring keyed integrity; and
encapsulation steps for including the secret message value in a higher level messaging protocol.

10. A recipient device for reception of a securely transmitted message, the recipient device being one of a plurality of recipient devices adapted to receive a message from an originating device, said message being associated with a particular one of a plurality of applications running on the originating device, the recipient device comprising:
 (i) means for extracting one or more of a device identifier, an application identifier and an application value from a received secure message having a secure message block, said one or more of the device identifier, the application identifier, and the application value being outside the secure message block, said application value indexing said message;
 (j) means for generating by a first process using the device identifier, the application identifier and the application value a message value;
 (k) means for generating, according to a second process using the device identifier and the application identifier a secret value known only to the originating device and the recipient device;
 (l) means for combining the message value with the secret value, to establish a secret message value;
 (m) means for extracting a secure message block from the received secure message; and
 (n) means for applying the secret message value and the secure message block to a decoding process to form the securely transmitted message, this message having been securely transmitted by the originating device.

11. A computer program product including a computer readable medium having recorded thereon a computer program for directing a recipient device to process a received secure message, the recipient device being one of a plurality of recipient devices adapted to receive a message from an originating device, said message being associated with a particular one of a plurality of applications running on the originating device, the program comprising;
 (i) code for extracting one or more of a device identifier, an application identifier and an application value from a received secure message having a secure message block, said one or more of the device identifier, the application identifier, and the application value being outside the secure message block, said application value indexing said message;
 (j) code for generating by a first process using the device identifier, the application identifier and the application value a message value;
 (k) code for generating, according to a second process using the device identifier and the application identifier a secret value known only to the originating device and the recipient device;
 (l) code for combining the message value with the secret value, to establish a secret message value;
 (m) code for extracting a secure message block from the received secure message; and
 (n) code for applying the secret message value and the secure message block to a decoding process to form the securely transmitted message, this message having been securely transmitted by the originating device.

12. A system providing secure communications, the system comprising an originating device and one or more receiving devices, wherein:
said originating device is adapted for securely encoding and transmitting a message to one of a plurality of recipient devices, the message being associated with a particular one of a plurality of applications running on the originating device, the originating device comprising:
 (a) means for determining a device identifier for the originating device, and an application identifier for each of the plurality of applications thereby forming a plurality of device-identifier/application identifier pairs;
 (b) means for associating a secret value with each device-identifier/application-identifier pair;
 (c) wherein each said secret value is known to the originating device and to one of the recipient devices;
 (d) means for generating a message value by a first process, using the device identifier, a particular said application identifier and an application value, said application value indexing said message;
 (e) means for combining the message value with a secret value associated with the particular application identifier to establish a corresponding secret message value;
 (f) means for applying the secret message value and the message to an encoding process to form a secure message block; and
 (g) means for combining the device identifier, the particular application identifier, the application value and the secure message block to form a secure message for transmission, said secure message being decodable, dependent upon the device identifier, the particular application identifier and the application value which are outside the received secure message block, by said recipient device to which said secret value associated with the particular application identifier is known, said recipient device thereby recovering the message, the device identifier, the particular application identifier and the application value; and wherein;
said recipient device is adapted for reception of a securely transmitted message, the recipient device being one of the plurality of recipient devices adapted to receive a message from the originating device, said message being associated with a particular one of a plurality of applications running on the originating device, the recipient device comprising:
 (h) means for extracting one or more of a device identifier, an application identifier and an application value from a received secure message having a secure message block, said one or more of the device identifier, the application identifier, and the application value being outside the secure message block;
 (i) means for generating by a first process using the device identifier, the application identifier and the application value a message value;
 (j) means for generating, according to a second process using the device identifier and the application identifier a secret value known only to the originating device and the recipient device;

(k) means for combining the message value with the secret value, to establish a secret message value;
(l) means for extracting a secure message block from the received secure message; and
(m) means for applying the secret message value and the secure message block to a decoding process to form the securely transmitted message, this message having been securely transmitted by the originating device.

13. A system according to claim 12;
wherein said originating device comprises;
(n) first processing means;
(o) transmitting means adapted to perform one or more establishing and maintaining communications with a receiving means, said first processing means being adapted to control said transmitting means, and adapted to support features (a) to (g);
wherein said receiving device comprises:
(p) second processing means; and
(q) the receiving means, being adapted to perform one or more of establishing and maintaining communications in conjunction with said transmitting means, said second processing means being adapted control said receiving means, and further adapted to support features (h) to (m).

14. A system according to claim 13, wherein said originating device comprises one of:
(r) a PC comprising the transmitting means, a smart card reader, the first processing means being responsive to the smart card reader and adapted to control said transmitting means, said originating device further comprising a smart card adapted to interface with the smart card reader, said smart card having on board second processing means which in conjunction with said first processing means are adapted to support features (a) to (g); and (s) a mobile telephone, comprising the transmitting means, the first processing means being adapted to control said transmitting means, and also adapted to support features (a) to (g); and (t) a set top box, comprising the transmitting means, the first processing means being adapted to control said transmitting means, and also adapted to support features (a) to (g); and (u) a cable modem, comprising the transmitting means, the first processing means being adapted to control said transmitting means, and also adapted to support features (a) to (g); and (v) a personal digital assistant, comprising the transmitting means, the first processing means being adapted to control said transmitting means, and also adapted to support features (a) to (g).

* * * * *